United States Patent
Springthorpe

[11] 3,968,564
[45] July 13, 1976

[54] ALIGNMENT OF OPTICAL FIBERS TO LIGHT EMITTING DIODES

[75] Inventor: Anthony John Springthorpe, Richmond, Canada

[73] Assignee: Northern Electric Company Limited, Montreal, Canada

[22] Filed: Apr. 30, 1975

[21] Appl. No.: 573,266

[52] U.S. Cl. .................................. 29/580; 29/589; 350/96 WG; 357/17
[51] Int. Cl.² ......................................... B01J 17/00
[58] Field of Search ............... 29/580, 576 IW, 589; 350/96 WG; 357/17

[56] References Cited
UNITED STATES PATENTS

| | | | |
|---|---|---|---|
| 3,846,193 | 11/1974 | Jacobus | 357/17 |
| 3,849,707 | 11/1974 | Braslau | 357/17 |
| 3,864,016 | 2/1975 | Dakss | 350/96 WG |
| 3,893,228 | 7/1975 | George | 29/580 |

*Primary Examiner*—W. Tupman
*Attorney, Agent, or Firm*—Sidney T. Jelly

[57] ABSTRACT

Accurate alignment between an optical fiber and a light emitting diode — having a double heterostructure — is obtained by building the multilayer heterostructure on a substrate surface on which has previously been formed a mesa. After formation of the structure, and forming of a contact on the outermost layer of the structure, in alignment with the mesa, the substrate is etched to form a clearance hole centered on the mesa, which is also removed. The mesa is of the same diameter as the optical fiber and removal of the mesa provides a recess which accurately locates the fiber relative to the light emitting area.

4 Claims, 5 Drawing Figures

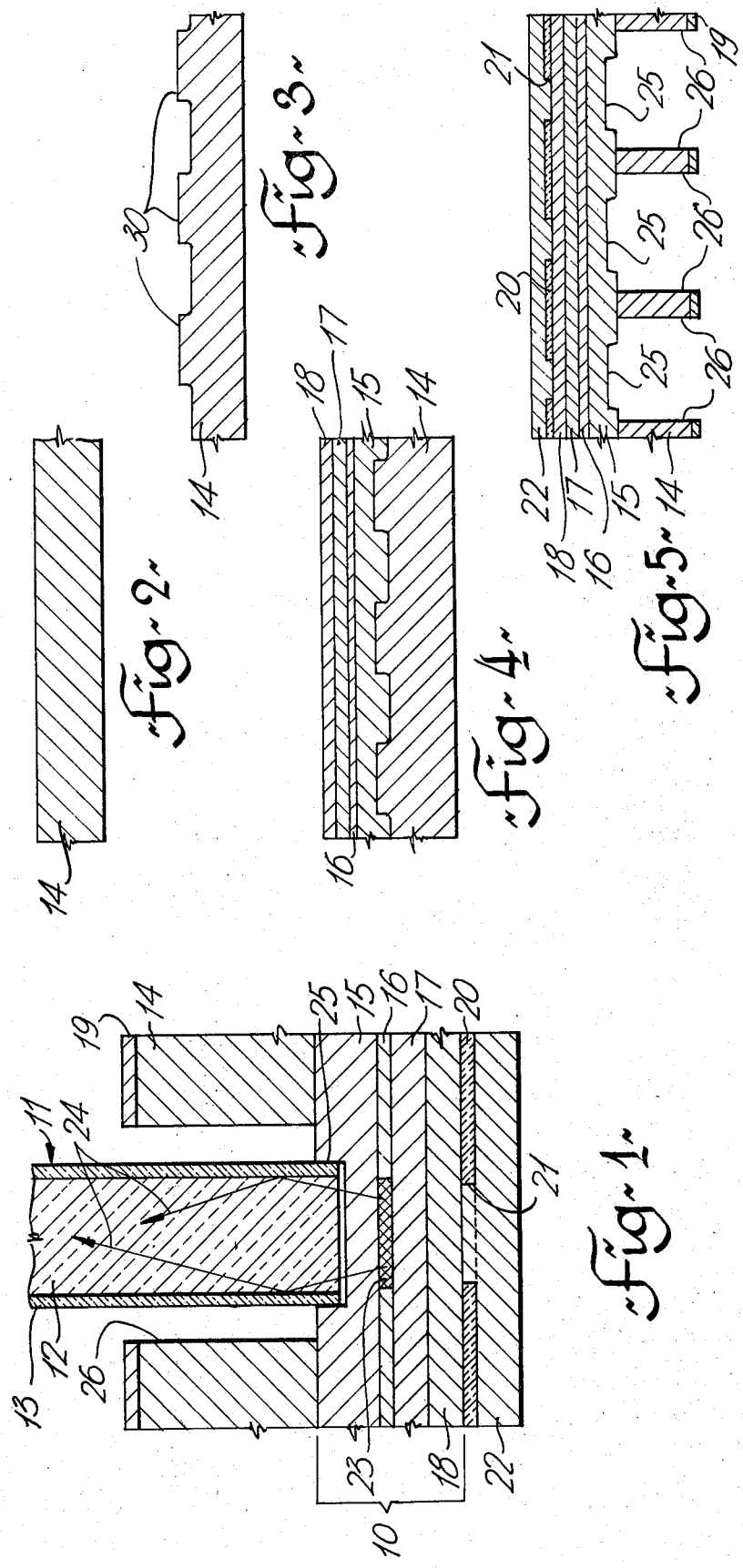

ALIGNMENT OF OPTICAL FIBERS TO LIGHT EMITTING DIODES

This invention relates to the alignment of optical fibres to light emitting diodes and particularly to the alignment of an optical fibre to a light emitting diode having a double heterostructure, the fibre extending with its axis normal to the plane of the active layer, or light emitting layer, of the double heterostructure.

It is desirable to ensure that the fibre is aligned as accurately as possible with the light emitting source for maximum coupling efficiency. However, the diameter of the fibre is very small (typically 50–125 $\mu$m core diameter) and the dimensions of the light source must be comparably small in order to maximize the coupling efficiency.

The present invention provides for accurate alignment by providing a locating hole in the structure, the locating hole being produced during fabrication of the light emitting structure and providing good alignment.

The invention will be readily understood by the following description of an embodiment, by way of example, in conjunction with the accompanying drawings, in which:

FIG. 1 is a cross-section through a light emitting structure of device with an optical fibre assembled thereto;

FIGS. 2 to 5 are diagrammatic cross-sections illustrating various stages in the formation of a light emitting device.

As illustrated in FIG. 1, a light emitting device, hereinafter referred to for convenience as an LED, is indicated generally at 10. An optical fibre 11 is assembled to the LED 10. The fibre in FIG. 1 comprises a light transmitting core 12 and an outer layer or cladding 13. The refractive index of the core is larger than that of the cladding and the light rays are trapped and guided in the core by total internal reflection. This is a known form of fibre and an alternative form is a fibre having a varying refractive index across a radius, in which instance there is normally no cladding 13.

The LED structure 10 is a double heterostructure, comprising a plurality of layers 15, 16, 17 and 18, on a substrate 14, typically as follows: substrate 14 — $n$ type GaAs; layer 15 — $n$ type $Ga_{1-x}Al_xAs$; layer 16 — $p$ type $Ga_{1-y}Al_yAs$; layer 17 — $p$ type $Ga_{1-x}Al_xAs$; layer 18 — $p$ type $Ga_{1-z}Al_zAs$, with $x = 0.35$; $y = 0.05$ and $z = 0$–$0.10$. Layer 16 is the active layer, layers 15 and 17 are confining layers, layer 18 is a capping layer and 14 is the substrate on which layers 15 to 18 are grown — conveniently by liquid phase epitaxy. It is possible to omit layer 18 in some instances.

Electrical contact layer 19 is formed on the substrate 14, for example of alloyed gold/germanium eutectic. A dielectric or insulating layer 20, for example of chemically vapour deposited phosphorus-doped $SiO_2$, is formed on layer 18. A hole is made in layer 20 for the purpose of contacting layer 18 using standard photolithographic techniques. Zinc is diffused into the surface of layer 18 through the hole, for example by heating the crystal with $ZnAs_2$ in a semi-sealed ampoule at 600°C for 15 mins, to a depth of <0.5$\mu$m to provide a low resistance ohmic contact. A composite contact layer 22, of evaporated Cr (100A) and Au (2400A) and electroplated Au (10–15$\mu$m), completes the electrical contact to layer 18.

When the device chip, FIG. 1, is biased electrically so that layer 19 is negative and layer 18 is positive light emission occurs from the central volume 23 for voltages greater than the "turn-on" voltage of the diode (>1.3V). The light is restricted to this region by the contact hole 21 which restricts the current flow. The area of 23 is slightly larger than that of the hole 21 due to slight current dispersion in the layers 16, 17 and 18. Light is emitted at 23 some of which enters the optical fibre, typical light rays being indicated at 24.

To obtain accurate alignment of the optical fibre 11 with the light emitting source or area 23, the end of the fibre is positioned in a recess 25 formed in the layer 15, the fibre also passing through a clearance hole 26 in the substrate 14.

The structure comprising the layers 14 to 20 and 22 is formed as follows, with reference to FIGS. 2 to 5. A substrate wafer 14 is prepared as in FIG. 2. One surface of the substrate is coated with chemically vapour deposited $SiO_2$, and circular pads are defined by standard photolithographic etching techniques. These pads serve to protect the substrate 14 beneath them when the exposed substrate surface is etched, by means of a non-preferential etch ($3H_2SO_4$: $1H_2O_2$ at 98°C) to leave a plurality of circular mesas, FIG. 3. The mesas 30 are the same diameter as the fibres 11. After formation of the mesas 30, and removal of the oxide from their tops the double heterostructure 10 is produced by successively epitaxially growing the layers 15 – 18.

A suitable structure is produced by sequentially growing the layers 15 – 18 by liquid phase epitaxy (LPE).

The compositions of the solutions required to grow layers 15 – 18 are determined by the Ga-Al-As phase diagram as modified by the electrical dopants to be incorporated. In the following, typical solution compositions are given for growth in the limited temperature interval 830°–815°C. Other temperatures and growth schemes are possible to one skilled in the art.

Layer 15 is grown from a melt solution containing 4gm Ga: 250mg GaAs: 6mg Al and 2mg Te. The solution is saturated at 830°C and is then cooled at 1°C/min to 825°C and left for 5 minutes to equilibrate. The solution is thus supersaturated and gives rise to rapid growth when the substrate is placed in contact with it. This rapid growth is essential to prevent annihilation of the mesas on the substrate. Cooling at 0.1°C/min to 820°C results in the formation of a planar interface some 5$\mu$m above the top of the mesas. The composition of this layer is approximately $Ga_{0.65}Al_{0.35}As$ with a Te doping level of approximately $10^{18}/cm^3$.

Layer 16 is then grown from a solution containing 4mg Ga: 350mg GaAs: 0.8mg Al: 30mg Ge which contacts layer 15 on the substrate as the system is cooled through the range 820°–819°C at 0.25°C/min to give an LPE layer approximately 1$\mu$m thick of approximate composition $Ga_{0.95}Al_{0.05}As$ with a Ge doping level of approximately $10^{18}/cm^3$.

Layer 17 is grown from a solution containing 4gm Ga: 250mg GaAs: 7mg Al: 150mg Ge, as the system is cooled at 0.25°C/min through the temperature range 819°–817°C, to yield a layer approximately 1$\mu$m thick, having an approximate composition $Ga_{0.65}Al_{0.35}As$ with a doping level of the order of $10^{18}/cm^3$.

Finally, layer 18 is grown by LPE on layer 17 from a solution containing 4gm Ga: 300mg GaAs: 1.6mg Al: 60mg Ge as the system is cooled at 0.25°C/min in the temperature range 817°–816°C to give a layer approximately 1 μm thick, having a composition of approximately $Ga_{0.90}Al_{0.10}As$ with a doping level of approximately $10^{18}/cm^3$.

As a comment, it is not necessary to incorporate Al in layers 16 and 18 since good results will be achieved if they are only GaAs. Aluminum is incorporated, in the example described, as; in layer 16 it reduces stress and prolongs operating life; in layer 18 it reduces absorption of the light emitted by layer 16 and helps to increase the total light output.

The epitaxially grown layers can be grown sequentially by positioning substrate wafers in a carbon slider which moves along to position the substrate wafers sequentially under reservoirs in a carbon holder. The solutions are formulated, as described above, to give the required layer characteristics. A typical form of apparatus for growing three layers is described in the paper "Preparation of GaAs p-n Junctions" by B. I. Miller and H. C. Casey, Jr., paper 24 in the 1972 Symposium of GaAs. The apparatus described can also produce four layers. A further form of apparatus for growing multiple layers is described in Canadian Pat. No. 902,803 issued June 13, 1972.

Following growing of the four layers 15 to 18, an oxide layer 20 is formed on layer 18, following which the oxide layer is photolithographically etched to form contact holes 21. Zinc is diffused into the surface 18 and contact layer 22 is then formed as by evaporating or otherwise depositing a layer of gold.

The zinc diffused rear surface of the substrate 14 is removed by lapping and/or etching and contact layer 19 is applied and alloyed to form an ohmic contact. The substrate is then photolithographically etched to form the clearance holes 26. The clearance holes are etched through the substrate — for example by etching in 30:1 $H_2O/NH_4OH$, which does not attack $Ga_{0.65}Al_{0.35}As$, and then washed. In this etching the mesas 30 are removed and form locating positions or recesses, 25, for the fibre. The structure then appears as in FIG. 5. It can then be divided into separate devices, which are bonded to suitable headers and wired for electrical operation using established technology.

The fibre 11, FIG. 1, is positioned in the hole 26 and recess 25 of the bonded device, by using a microscope and micro-manipulator, and may be permanently fixed in place by means of a suitable adhesive potting compound — e.g. epoxy. The recesses 25 provide positive location and correct alignment. In the production of the devices, the masking in the photo etching step to form the contact areas or holes 21 is arranged to be such that the contact areas 21 are aligned with the mesas 30. Thus the light emitting areas will be aligned with the contact areas 21 and the recesses 25 as the positions of the recesses 25 are defined by the mesas 30.

What is claimed is:

1. A method of aligning optical fibres to light emitting diodes, comprising;
   forming a mesa on a surface of a semiconductor substrate;
   said mesa of a diameter equal to the diameter of an optical fibre;
   sequentially forming a plurality of layers on said one surface, said layers including first and second confining layers and an active layer between said confining layers;
   forming a contact on an outer layer of said plurality of layers, said contact aligned with said mesa;
   forming an electrical contact layer on the surface of the substrate remote from said one surface;
   forming a clearance hole in said substrate, said clearance hole surrounding and being larger than said mesa, and removing said mesa to form a locating recess in the first of said plurality of layers for said fibre.

2. A method as claimed in claim 1, wherein a plurality of mesas are formed on said one surface;
   a plurality of contacts are formed, a contact aligned with each mesa, and a plurality of clearance holes and locating recesses are formed in said substrate.

3. A method as claimed in claim 1, wherein said plurality of layers are sequentially grown by liquid phase epitaxy.

4. A method as claimed in claim 2, wherein said plurality of layers includes a capping layer forming an outer layer, said contact being on said capping layer.

* * * * *